United States Patent [19]
Fischer

[11] 3,790,109
[45] Feb. 5, 1974

[54] AMPHIBIOUS UNDERCARRIAGE FOR AIRCRAFT

[76] Inventor: C. Fink Fischer, 369 Mercer Rd., Princeton, N.J. 08504

[22] Filed: Mar. 15, 1971

[21] Appl. No.: 124,029

[52] U.S. Cl. .............................................. 244/105
[51] Int. Cl. ............................................ B64c 25/54
[58] Field of Search .... 244/101, 100 R, 101 R–109, 244/50; 114/66.5 R, 66.5 F, .5 F

[56] References Cited
UNITED STATES PATENTS

| | | | |
|---|---|---|---|
| 1,757,687 | 5/1930 | Silva, Jr. | 244/101 |
| 1,930,922 | 10/1933 | Burnelli | 244/101 |
| 2,196,946 | 4/1940 | Stone | 244/101 |
| 3,159,364 | 12/1964 | Sheaffer et al. | 244/101 |
| 1,865,789 | 7/1932 | Reel | 244/101 |
| 2,383,870 | 8/1945 | Ludington | 244/101 |
| 3,184,189 | 5/1965 | Jackson | 244/101 |

*Primary Examiner*—Duane A. Reger
*Assistant Examiner*—Paul E. Sauberer

[57] ABSTRACT

The invention is an amphibious undercarriage for aircraft and is also an undercarriage for seaplanes providing improvements which reduce the maximum landing and takeoff structural loads in the aircraft, reduce the weight and drag of the seaplane, and provide capability for seaplane undercarriages to alight on snow.

6 Claims, 5 Drawing Figures

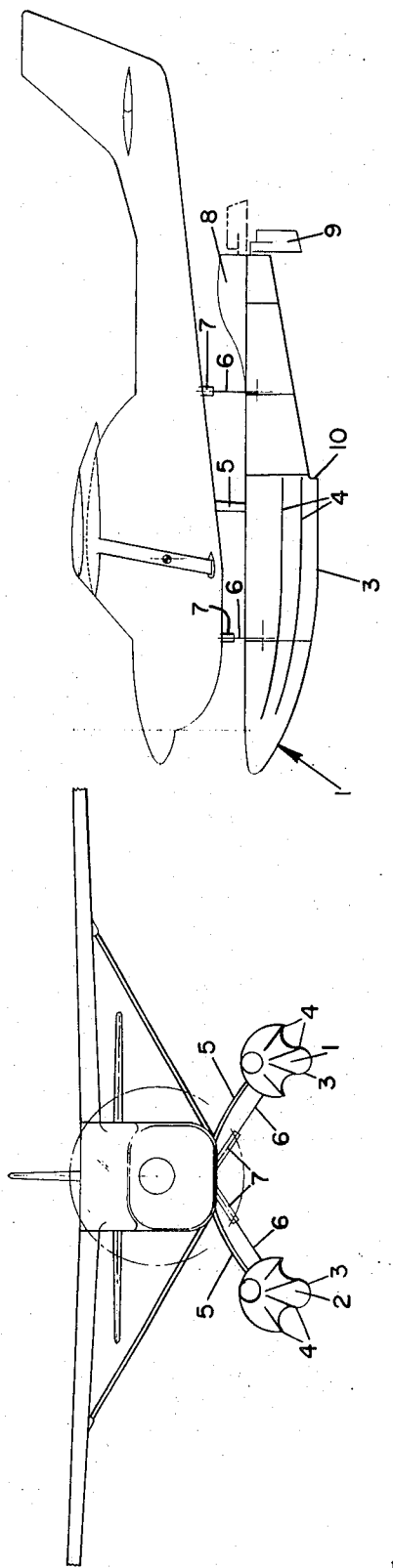

INVENTOR.

AMPHIBIOUS UNDERCARRIAGE FOR AIRCRAFT

SUMMARY OF THE INVENTION

The objects of the invention are to substantially increase the payload and performance of seaplanes by reducing the weight and drag of undercarriage installation, to simplify the installation of seaplane floats on land planes, to simplify the mechanism for affording amphibious capability to seaplanes, to afford to seaplanes the capability of landing on snow, to reduce the water spray thrown on the aircraft while landing or taking off from the water.

These objects are achieved by a novel method of suspending seaplane floats from the main landing gear wheels of aircraft; for retracting the floats to use the wheels on land; and an interdependent and novel shape of the floats.

During operations on water the suspension utilizes the shock absorbing capability of the conventional land gear undercarriage. A feature of the suspension is a means for selecting or controlling the pitch of the float to be fixed, free, or damped and spring restrained in various amounts, thereby permitting the utilization of the float bottom for alighting on snow; and during take-offs from water to permit the floats and the aircraft independent of one another to assume the most favorable pitch; and particularly to permit the aircraft at takeoff speed to increase its trim to maximum lift angle of attack while allowing the floats to continue planing at minimum drag trim. A further consequence of this feature is the opportunity to dispose of the usual amidships step in the floats and the upward sweep of the afterbody thereby reducing the drag and weight of the float.

Present art requires a step, which is a lateral discontinuity in the bottom surface of the float which encourages the early separation of the water flow from the after portion of the float. When thus planning on the bottom of the float forward of the step, the discontinuity of the step located longitudinally amidships near the center of gravity, together with the upward sweep of the afterbody, permits the aircraft to rotate around its center of gravity to obtain maximum aerodynamic lift without dragging the afterbody in the water which would decelerate the aircraft and make the takeoff impossible. The new art does away with this requirement for the step.

DESCRIPTION OF DRAWINGS

FIG. 1 shows in front view and FIG. 2 shows in side view the undercarriage installed on an aircraft with floats extended for water or snow landing.

FIG. 3 shows the float in the retracted position with the wheels exposed for alighting on land.

DETAILED DESCRIPTION OF THE INVENTION

Figure 3:
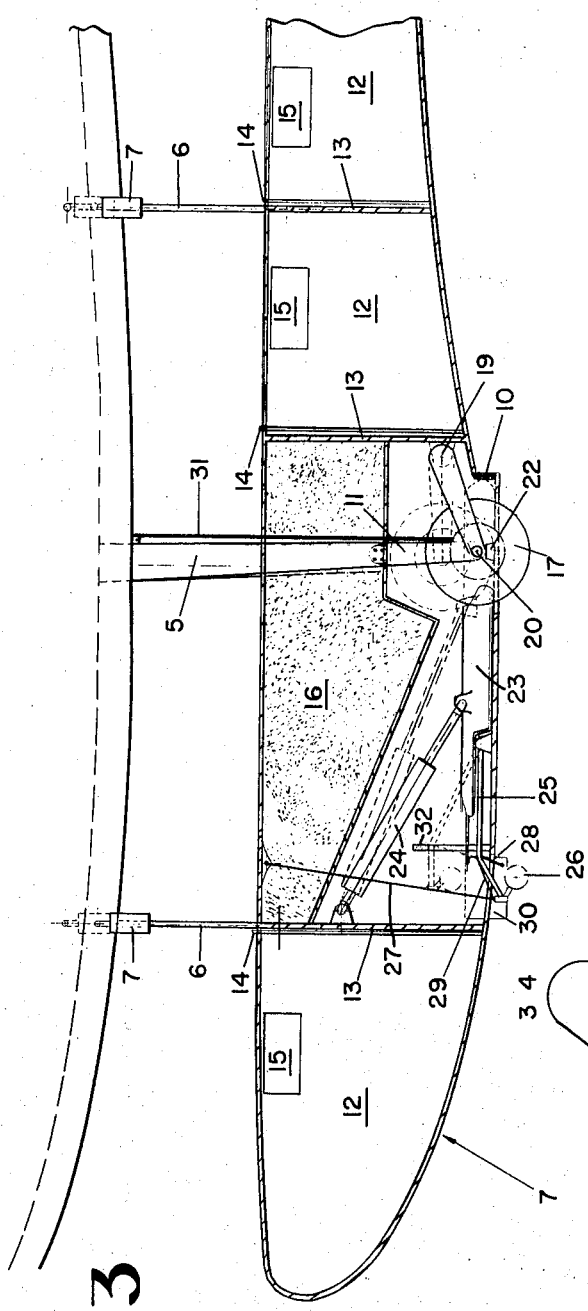
FIG. 3 is an inboard profile of one float showing the arrangement of the suspension and retraction mechanism.
Figure 4:
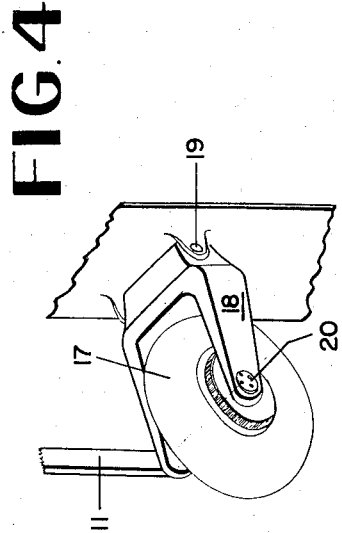
FIG. 4 is an enlarged perspective view of the float suspension fork mounted on a main wheel.
Figure 5:
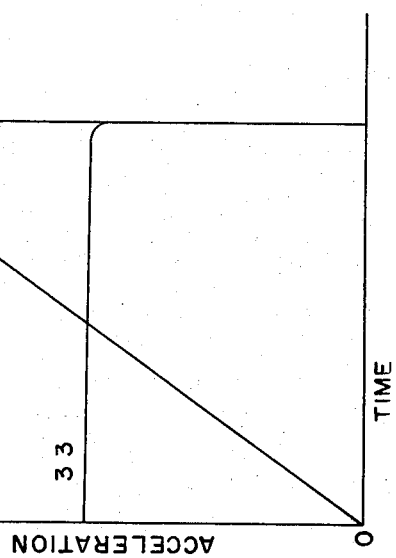
FIG. 5 shows the resulting reduced peak vertical deceleration during landing and shows how it differs from prior art.

Two floats (1) and (2) capable of supporting the aircraft while at rest on the water by their static buoyancy are attached to the aircraft through the usual main wheel landing gear steel spring struts (5) and steel cables (6).

The usual landing gear strut and spring (5) has its axle and wheel (17) removed and a steel extension (11) bolted onto the strut (5) in lieu of the original axle. The steel extension (11) serves to vertically position the seaplane float a sufficient distance below the aircraft so as to provide adequate propeller clearance from the water, and to longitudinally position the seaplane float in the fore and aft location for proper static and dynamic balance of the assembly.

A special axle (20) is bolted to the lower end of the extension (11). The special axle (20) has the usual journal to accommodate the aircraft's main wheel (17) and in addition has a journal on its inboard end and another on its outboard end to accommodate the bearings of the fork (18). Of necessity, to permit mounting of the fork (18) and the wheel (17) on the axle (20), the inboard journal and related fork bearing are of a diameter greater than the main wheel journal, and the outboard journal and bearing are smaller in diameter.

The fork (18) may or may not include an accommodation for accepting the reaction of the disk brakes on the outboard side of the wheel (17) in lieu of the usual attachment of these brakeshoes to the same structural member on which the axle is mounted. The reason for this option is to reduce the distance from the supporting strut extension (11) to the circumferential plane of the wheel (17).

The fork (18) is mounted to a float bulkhead (13) by bolts through eyes (19) which are affixed to the bulkhead with center line of the eyes parallel to the special axle (20). Thus the fork (18) is permitted angular motions in a vertical plane both around the center line of the eyes (19) and around the special axle (20).

As a consequence of this cooperation of these parts, the float is suspended from the aircraft and free to rotate in a vertical plane with a corresponding amount of related linear vertical motion. This rotation and vertical motion is controlled and limited by the contact of the main wheel (17) with the inside bottom of the float and the prior mentioned two cables (6) connecting the afterbody of the float to the afterbody of the aircraft fuselage and the forebody of the float to the forebody of the aircraft fuselage through spring damper elements (7).

The attachment points of these cables (6) on the aircraft fuselage and on the seaplane float are selected with regard to the attachment point of the landing gear strut (5) to the fuselage and the reaction point of the main wheel (17) on the seaplane float so that the three straight lines connecting these three pairs of points are parallel and as nearly as possible in the same plane. As a consequence of this arrangement, the flexure of the landing gear struts (5) while absorbing the loads of water landing are allowed by corresponding change in the direction of the parallel attaching cables (6) without the requirement for a variation in their length. At the same time the compression of the tire on main wheel (17) in absorbing some of the landing load is accommodated by a contraction of the spring damper elements (7).

Spring damper elements (7) are any of the well understood mechanisms which provide a spring tension with selectable stops for setting the limit of the spring travel in either direction and which provide a damping of this motion. The value of the damping may also be changed by selectable settings. Different settings of these stops limiting spring travel and different settings of the damping value may be used in the various applications of the suspension as described later.

For water landings with the float in the fixed position of prior art, the spring damper elements (7) are set for the limited travel required to accommodate the tire compression and the damping value is selected to detune the system from any oscillatory mode.

In order to provide the capability of utilizing the main wheel (17) for alighting on land, a hole is made in the bottom of the float to permit the float (1) to be retracted upward thus exposing the main wheel. The previously described contact of the main wheel (17) with the inside bottom of the float (3) is in this arrangement replaced by restraint on a sliding acutator plate (23) designed to smoothly fit the hole in the bottom of the float. The actuator plate (23) is arranged to slide fore and aft on the inside bottom of the float being substantially restrained to this motion by fore and aft guides and this fore and aft motion of actuator plate (23) is powered by any conventional linear actuator (24). Now as the actuating plate (23) is pulled foward by the linear actuator (24) the main wheel (17) rolls over the plate to its edge and falls through the hole in the bottom of the float as a consequence of the springs (7) and their attached cables (6) retracting the float until the ends of the axle (20) impinge on the stops (22) affixed to the float structure. At this point the trim attitude of the retracted float is established by stops on the travel of the spring damper elements (7). The selection of these stops for the travel of spring elements (7) is of necessity different thatn the selection of the stops for operation as a fixed seaplane landing gear as prior described.

As the previously described forward motion of the actuator plate (23) takes place, a properly shaped accommodation in its forward end engages a pivoted leaf spring (25) at the top of its pivot point and as the actuator plate continues its forward motion, its cooperation with the leaf spring forces it downward against the upward restraint of a spring (27) connected to the forward end of the leaf spring. At the forward end of the leaf spring (25) is mounted a castering nose wheel (26).

A hinged door (30) is provided in the float bottom which is normally held closed by spring (28) connected between the door and the leaf spring (25). When the leaf spring (25) is forced downward by the forward motion of the actuator plate (23) the closing force of spring (28) on the nose wheel door (30) is relieved and the nose wheel (26) forces the door open. The door (30) is held in the open position by stops on the side of the leaf spring (25). As the nose wheel (26) is thus extended to a position where it can engage the ground, it is guided laterally to this position by vertical guides (32) bearing on the left and right sides of the forward part of the leaf spring (25). These guides (32) also react lateral loads from the nose wheel (26).

The castering wheel (26) and its mounting to the leaf spring (29) is similar or identical to existing mountings of existing tail wheels in conventional landing gear except that the wheel leaf spring assembly is oriented so the wheel and its end of the leaf spring is forward instead of aft. Steering of the aircraft by braking main wheel (17) is accommodated by the castering of the nose wheel (26) and the necessary damping of the castering action is provided by any of the usual friction methods afforded in existing tail wheels applied to this new use as a nose wheel.

To extend the floats the linear actuator (24) drives the actuating plate (23) aft, thus releasing the leaf spring (25) so it can be retracted by spring (27) with a consequence closing of the door (30) through the action of the spring (28). As the actuator plate (23) engages wheel (17), the wheel rolls up over the lip of the actuating plate thereby forcing the float downwards against its spring restraints (7) until the limits of these spring travels are reached at the point where the actuating plate covers the main wheel hole and the main wheel is bearing down on the actuating plate holding it firmly in place. In this condition the undercarriage is in streamlined condition for flight and is prepared for landing on water as previously described or for landing on snow or ice as described below.

In order to contain the main wheel (17) in the float (1), and to provide adequate extension of the wheel below the keel of the float as a result of the limited retraction of the float previously described, it is necessary that the float bottom section immediately adjacent to the keel be comparatively flat. This flat section (3) is carried the length of the forebody to provide sufficient area to serve as a landing ski.

The cross section of the previously discussed actuating plate (23) must of necessity conform with this comparatively flat bottom section near the keel since it serves to smoothly cover the wheel hole in it. The actuating plate (23) must also extend beyond the hole away from the keel far enough to obtain bearing surface on which to slide and on which to react the landing loads transmitted from the float to the tire of the main wheel (17). This bearing surface is obtained on the float bottom where sharp upward curvature of the float section has commenced and is thus substantially above the bottom of the float where the tire of the main wheel (17) is in contact with the surface of the actuating plate (23).

For utilizing the prior mentioned nearly flat bottom section of the float for ski landings on snow or ice, the floats are lowered and stops are selected for the spring damper elements (7) that result in the floats assuming a slightly nose high attitude in flight and yet permitting the floats to rotate to a level or slightly nose low attitude as required for the float bottoms to accommodate themselves to the snow or ice surface upon landing in the well known manner of existing ski aircraft landing art.

As a consequence of the necessarily relatively flat bottom (3) of the float cross section in the vicinity of the keel previously described, the initial vertical deceleration of water landing commences at a finite value (33). In present art using V bottom floats the initial deceleration is zero and steadily builds up to a maximum (34) at the time when vertical velocity is completely arrested. The invention results in a vertical landing deceleration that remains substantially constant from first impact until the vertical motion is terminated and thereby greatly reduces the peak deceleration experienced in present art. The float cross section (35) which produces this result curves smoothly upwards from the nearly flat bottom near the keel and then outwards to accomplish an average dead rise of approximately 30° from the keel to an intersection with the float walls at the chine in a dihedral angle greater than 90°. As a consequence of the downward direction of the float bottom section where it intersects the walls, spray generated by the motion of the float is directed downwards and away from the fuselage making unnecessary the installation of a spray rail required in present art to accomplish this result.

The aforementioned vertical plane at the stern of the float is extended upward to provide fin area (8) to aero-dynamically stabilize the float in yaw and remove the need in present art for installing additional vertical fin area on the aircraft when the seaplane undercarriage is installed.

The retracting water rudder (9) is mounted on the aerodynamic fin (8) thereby removing the need for a surface on the stern of the float for this purpose and permitting the stern of the float to be streamlined.

The invention affords the opportunity to select spring force and damping and extent of spring travel in the element (7) for improved water takeoff or for water takeoff with floats not having a centrally located step. The selection or control of the spring damping constands in element (7) are determined by the geometry of the particular installation and most particularly by the angle of attack corresponding to maximum lift of the aircraft wings. This accommodation permits the effective use of various high lift devices which normally require a very high angle of attack to generate the maximum lift which cannot be achieved while planing on the water with existing float installations. Thus, the co-operation of these elements under the selection and control of the pilot permits the aircraft to conduct its takeoff run in a pitch attitude corresponding to minimum aerodynamic drag while the undercarriage floats trim to the pitch attitudes corresponding to minimum water drag for the various phases of the takeoff run. That is, as the aircraft commences its takeoff run, the floats move to their maximum pitch attitude as they proceed most rapidly to a planing condition and then rapidly decrease their pitch as planing is achieved until near takeoff speed the pitch is nearly zero and continues so as the aircraft itself now increases its pitch to provide the necessary high angle of attack for maximum lift for takeoff.

Two of the watertight bulkheads (13) located aft of the main wheel (11) and forward of the nosewheel (26), bound a space containing the wheels and their related actuating mechanisms. The door (30) and plate (23) form a streamlined closure to this space which, however, is not watertight and while the aircraft is at rest on the water the space fills with water to the level of the outside water surface. To minimize this flooding most of the space not occupied by the wheels and their actuating mechanisms is filled with foam (16) or isolated by a watertight wall. The flooding water is thus reduced to a nominal amount and this flooding water is discharged from the wheel space through orifices (10) in the step. These orifices (10) are long orifices cast in the structural material of the step so as to operate at maximum discharge coefficient of approximately one, and the number and size of the orifices are selected to provide complete discharge of the flooding water from the wheel space in approximately 12 to 15 seconds which is the approximate time for a seaplane to get on the step and commence planing. The discharge of this flooding water through the orifices (10) to the low pressure region behind the step provides an early ventilation to the step, greatly reducing its initial drag during the critical part of the takeoff run when the aircraft is getting on the step.

A retracting rudder (9) may be installed on one or both floats to facilitate control of the aircraft while in the water. The fin (8) affords structural support for the rudder (9) and removes the requirement in present art for a surface at the end of the float on which to mount the rudder, which permits streamlining the stern of the float. The control of rudder (9) and the linear actuator (24) is accomplished from the aircraft via suitable flexible cables, wire, or hose (31), routed to the float alongside the landing gear spring strut (5).

As a related novel feature of this invention, each watertight compartment (12) has installed a tube (14) whose bottom end is located at the lowest point of the watertight compartment and whose upper end is flush with the upper deck of the float. This provides a novel and simple means for removing any water which may leak into the watertight compartments. The procedure for removing water is to apply a low pressure air supply from an air utility hose or pump to the upper orifice. The resulting internal air pressure drives any accumulated water out through tube (14).

What is claimed is:

1. An undercarriage for aircraft for attachment to the two main tires, wheels, and struts of land aircraft providing for water take off and landing, and providing for said wheels and struts to absorb shock of said take off and landing, comprising an extension plate connected to each strut, the main wheel connected to the end of the extension plate, and a float connected to the bottom of the tire of the main wheel, the connection to the bottom of the tire being made by a fork journaled at the forked end to an axle of the main wheel with the other end of the fork pivoted to the float with the pivot axis parallel to the main wheel axle, the float connected by a cable from the forebody of the float to the aircraft, by another cable from the afterbody of the float to the aircraft, both cables located in the same plane with the strut and each cable containing a means for applying tensioning and motion damping forces to the cable, whereby the inside bottom of the float is pulled against the tire so that water landing loads are transmitted from the float to the tire, the resulting compression of the main wheel tire and strut being accommodated by said means for applying tensioning and damping forces in the cables, and the resulting bending of the strut being accommodated by corresponding motion of the coplanar cables.

2. An undercarriage for aircraft as described in claim 1 providing for ski takeoff and landing, wherein said means for applying tensioning and damping forces in said cables has mechanical means for limiting the extension and contraction of said cables so as to restrain said float while the aircraft is in flight to a nose high attitude, yet permitting said float to rotate in pitch against said tensioning and damping forces as said float bottoms contacts and conforms with the snow terrain during landings and take off in the usual manner of ski undercarriages.

3. An undercarriage for aircraft as described in claim 2 providing for wheel take off and landing comprising a hole made in the bottom of said float under said main wheel tire, the whole being covered with an actuating plate, the actuating plate having means for constraint to a fore and aft sliding motion on the bottom of said float, the actuating plate having controlled means for causing the fore and aft sliding motion, the actuating plate having means for engaging a leaf spring to the bottom of the forebody of said float, a castering nose wheel being mounted at the forward end of the leaf spring, a means for forcing the pivoted leaf spring against the actuating plate, said float having a spring loaded door in the bottom of the forebody to provide egress for the nose wheel; thereby causing linear vertical retraction of said float to expose the said main landing wheel for use in alighting on land and for simultaneously causing the castering nose wheel to extend from said float for use in alighting on land.

4. An undercarriage for aircraft as described in claim 1 in which said float has a cross sectional shape providing a large reduction in the maximum vertical deceleration experienced in water landing, comprising a nearly flat bottom at the keel curving sharply upward to an outward and downward concave curve at the chines, the average deadrise angle being about 30°, thereby first presenting the nearly flat bottom at the keel to dynamic impact with the water surface so generating an initial vertical decelerating force which remains approximately constant as the cross section immerses at reducing velocity by exposing a greater area to the reducing vertical dynamic pressure.

5. An undercarriage for aircraft as described in claim 1, providing aerodynamic yaw stability to said float, comprising a vertical fin connected to the afterbody of said float, whereby the natural aerodynamic yaw instability of said float is neutralized by the area of the vertical fin acting against the airflow thereby reducing the inflight yawing torques which must be transmitted between said float and the aircraft by the said fork.

6. An undercarriage for aircraft as described in claim 5 providing reduced aerodynamic drag by said float comprising afterbody streamlining to zero cross section area at the stern cross section, whereby the water rudder is hinged to said fin.

* * * * *